United States Patent Office 3,642,684
Patented Feb. 15, 1972

3,642,684
DISPERSION-TYPE PAINT OF VINYLIDENE-FLUORIDE-CONTAINING POLYMERS
Hideaki Kusuno and Miyoji Uchida, Hyogo-ken, and Masahiro Segawa and Yukichika Kawakami, Fukushima-ken, Japan, assignors to Nihon Paint Kabushiki Kaisha, Osaka-shi, Osaka-fu, and Kureha Kagaku Kogyo Kabushiki Kaisha, Tokyo-to, Japan
No Drawing. Filed July 24, 1969, Ser. No. 844,626
Claims priority, application Japan, July 29, 1968, 43/53,467
Int. Cl. C08f 45/36, 45/44
U.S. Cl. 260—31.8 F                    5 Claims

ABSTRACT OF THE DISCLOSURE

A dispersion-type paint of vinylidene-fluoride-containing polymer principally composed of vinylidene fluoride polymer particles uniformly dispersed in a mixture of a high boiling point organic solvent and a low boiling point organic solvent, both being capable of lowering the crystal melting point of polyvinylidene fluoride to specific upper and lower temperature ranges.

This invention relates to a novel dispersion-type paint of vinylidene fluoride homopolymers or its copolymers.

It is an object of the present invention to provide a dispersion type paint, in which vinylidene fluoride homopolymers or copolymer is dispersed in a mixture of solvents consisting of one or more kinds of high boiling point organic solvent and one or more kinds of low boiling point organic solvent.

The nature and principle of the present invention will become more apparent from the following detailed description of the invention along with the preferred examples thereof.

Vinylidene fluoride polymers are produced by such known processes as disclosed in U.S. Patent No. 2,559,752 (E. I. du Pont de Nemours & Co. Inc., U.S.A.), are highly crystalline, and possess various excellent physical properties such as strength, rigidity, elasticity and so forth. They also exhibit high chemical resistance against acids and bases. Furthermore, among known resins for paints, they show the highest stability with respect to the sun light beams. By utilizing these characteristics, vinylidene fluoride polymers can be used as surface coatings for machines and apparatuses such as tanks and mixers, in which high resistance against chemical erosion is required, as well as surface coatings of metal sheets such as roofing and exterior wall sheathing of building structures which are required to withstand exposure to the elements.

In most of these applications, however, formation of the coatings from the polymers in molten state is disadvantageous. That is, it is difficult to handle vinylidene fluoride polymers in molten state at a temperature of approximately 200° C., at which the viscosities of the molten polymers are extremely high, being of the order of from $10^4$ to $10^6$ poises.

In order to overcome the above described difficulty, we have studied, as a different method of forming such surface coatings, a technique of causing vinylidene fluoride polymers to disperse in a high-temperature organic solvent.

While the present invention is primarily directed to the dispersion type paint of vinylidene fluoride polymer itself, any vinylidene fluoride copolymer containing at least 95 mol percent of vinylidene fluoride may be used. As monomers suitable for the copolymerization, there are compounds such as symmetric dichloro-difluoro-ethylene, 1,1,2-trifluoro-2-chloro-ethylene, tetrafluoroethylene, vinyl fluoride, vinyl chloride, and other halogenated ethylenes. As far as these copolymers contain at least 95 mol percent of vinylidene fluoride, the important characteristics of the dispersion of vinylidene fluoride copolymers are regarded as essentially same with the characteristics of the dispersion of homopolymers. Therefore, the term "polyvinylidene fluoride" used in this application designates both vinylidene fluoride homopolymers and the above defined vinylidene fluoride copolymers.

In general, the solvation effect of an organic liquid to the polyvinylidene fluoride can be determined semi-quantiatively by means of the capability of the organic liquid to lower the crystalline melting point $Tm$ of the polymers. This crystalline melting point $Tm$ is the first order transition point of the polymers, the measured value of which, in the absence of the solvent, is 160° C. to 180° C. By utilizing an organic solvent having the solvation effect with respect to polyvinylidene fluoride, it is possible to lower the crystalline melting point $Tm$ of polyvinylidene fluoride. Measurement of a drop in the crystalline melting point of polyvinylidene fluoride due to the solvent can be done by clamping a sample film of the polymer together with the solvent between crossed polaroid sheets and then raising the temperature. In the course of this process, the light transmission which can be recognized in a dark sight due to birefrigence of the polymer disappears as soon as the solvation effect of the solvent to the polymer reaches to such an extent that the crystallinity of the polymer is destroyed. In this manner, specific values of the crystalline melting point of various organic solvents with respect to the polyvinylidene fluoride can be measured in accordance with the solvation effect of the respective organic solvent to the polymers. However, the polyvinylidene fluoride having extremely high crystallinity varies its degree of crystallization over a wide range depending on the manufacturing conditions of the polymer film, hence the crystalline melting point $Tm$ thereof does not take a definite value.

The film used for measuring the crystalline melting point $Tm$ is 12 microns thick and has been obtained by first applying onto a chrome plate a dispersion in which polyvinylidene fluoride particles are dispersed in a mixture solvent of dimethylphthalate and diisobutyl-ketone at a mixing ratio (by weight) of 4:1, then drying the applied coating for 30 minutes at a temperature of 200° C., and finally left to cool at a room temperature.

In the case of forming a surface coating with the dispersion of polyvinylidene fluoride, it is desirable to use a solvent that can bring the crystalline melting point $Tm$ of the polymer into a range of from 90° C. to 120° C. If the crystalline melting point of the polymer is higher than 120° C., adhesivity of the coated film to an object to be painted and surface conditions of the coated film are not satisfactory. In order to improve such deficiencies, the heating temperature should be raised and the baking time should be lengthened, which is not only uneconomical but also accompanied by various technical difficulties. On the other hand, if the crystalline melting point $Tm$ is lower than 90° C., a part of polyvinylidene fluoride is dissolved, while the dispersion is being stored with the consequent defects such that the viscosity of the dispersion increases, the dispersion becomes gelated, and painting work becomes difficult, hence uniform coating is difficult to be obtained.

Furthermore, even with the solvent capable of lowering the crystalline melting point $Tm$ in the range of 90° C. to 120° C., the physical properties of the coating and its surface state are affected by the kinds of solvent. Generally, when a paint is applied to an object to be painted and is then dried at a high temperature, the condition of the painted surface is governed by the boiling point of the solvent used. With a paint using a solvent of extremely low boiling point, there are easily caused discontinuous points, pin-holes, and disappearance of luster, etc. on the coated film, because of poor solvency to the polymer at the film forming temperature. Such undesirable conditions may be eliminated by utilization of a solvent having slow rate of evaporation. However, most of the organic solvents of high boiling point and slow rate of evaporation are inferior in the capability of lowering the crystalline melting point $Tm$ of polyvinylidene fluoride, the $Tm$ range of which is outside of 90° C.–120° C. It is therefore difficult to practically use this kind of solvent for the dispersion liquid of high temperature heating type.

As the result of continuous studies and researches, a novel and effective method of producing a painting material by using an organic solvent of high boiling point and slow rate of evaporation and yet capable of maintaining the crystal melting point $Tm$ of polyvinylidene fluoride in the aforementioned range of 90° C.–120° C. has been invented. According to this method, polyvinylidene fluoride is dispersed in a mixture solvent consisting of a high boiling point solvent capable of lowering the crystalline melting point of polyvinylidene fluoride and a low boiling point solvent capable of remarkably lowering the crystalline melting point $Tm$ thereof, whereby it becomes possible to improve the surface state of the coated film and to manufacture the dispersion solution at a low cost by utilizing the high boiling point organic solvent available at a low price.

Useful polymers of vinylidene fluoride to be used in the present invention possess their intrinsic viscosity $\eta_i$ in the range of from 0.8 to 5.0 (a range of from 1.0 to 2.0 being particularly useful). The high boiling point organic solvents useful for the present invention impart to the vinylidene fluoride polymer a crystalline melting point $Tm$ in the range of 110° C. to 150° C., and the boiling point at 760 mm. Hg of 300° C. to 400° C. (300° C. to 350° C. being particularly useful). Examples of these organic solvents are: methylphthalyl-ethylglycolate, diisobutyl-phthalate, di-butylphthalate, diethyl-sebacate, ethylphthalyl-ethylglycolate, etc. Also, the low boiling point solvents useful for the present invention impart to the vinylidene fluoride polymer of crystalline melting point $Tm$ in the range of 40° C. to 70° C., and the boiling point at 760 mm. Hg of 140° C. to 220° C. (150° C. to 200° C. being particularly useful). Examples of these organic solvents are: dimethyl-formamide, dimethylacetamide, etc.

Of these organic solvents of high boiling point and low boiling point, one or more of them are arbitrarily selected from each of the groups and mixed. The mixing ratio (part by weight) of high boiling point organic solvent and low boiling point organic solvent ranges from 99:1 to 50:50 (particularly useful range of the mixing proportion is from 90:10 to 70:30). When the ratio of the low boiling point solvent exceeds 50%, the crystalline melting point $Tm$ of the mixture solvent frequently becomes lower than 90° C., which brings about increase in viscosity while the dispersion is being stored. Further, when a paint containing much quantity of low boiling point organic solvent is applied onto an object to be coated and dried, craters, and pinholes are prone to occur.

The measured values of the crystalline melting point $Tm$ with respect to polyvinylidene fluoride and the boiling points of the respective organic solvents useful for the present invention are indicated in Table 1 below. Also, the $Tm$ values of the mixture solvents useful for the present invention are shown in Table 2.

TABLE 1

[Crystalline melting point ($Tm$ ° C.) of PVDF vs. boiling point of individual organic solvents]

| Organic solvent | | Crystalline melting point $Tm$ (° C.) of PVDF | Boiling point (° C.) of solvents at atmospheric pressure |
|---|---|---|---|
| Low boiling point | Dimethylformamide | 44 | 153 |
| | Dimethylacetamide | 48 | [1] 165.5 |
| High boiling point | Methylphthalyl-ethylglycolate | 123 | 310 |
| | Diisobutylphthalate | 127 | 315 |
| | Dibutylphthalate | 137 | 340 |

[1] At 758 mm. Hg.

TABLE 2

[Crystalline melting point ($Tm$ ° C.) of mixture solvents]

| | Dimethyl-formamide | | | Dimethyl-acetamide | | | DMF/DMA ( =1/1) |
|---|---|---|---|---|---|---|---|
| Low boiling point organic solvent | 10 | 20 | 30 | 10 | 20 | 30 | 20 |
| High boiling point organic solvent | 90 | 80 | 70 | 90 | 80 | 70 | 80 |
| Mixing quantity (parts by weight) of: | | | | | | | |
| Methylphthalylethylglycolate | 108 | 97 | 87 | 110 | 102 | 90 | 100 |
| Diisobutylphthalate | 116 | 107 | 96 | 118 | 116 | 112 | 110 |
| Dibutylphthalate | 118 | 111 | 103 | 120 | 114 | 99 | 112 |
| Methylphthalylethylglycolate/ diisobutylphthalate=1/1 | 114 | 103 | 93 | 114 | 112 | 107 | 106 |

The dispersion-type paint of polyvinylidene fluoride is prepared by dispersing the polyvinylidene fluoride particles of less than 20 microns in diameter (more preferably less than 1 micron) into the mixture solvent consisting of high boiling point organic solvent and low boiling point organic solvent as shown in Table 2. The rate of dispersion of the polyvinylidene fluoride in the mixture solvent is from 5 to 60% by weight in terms of solid content. For the dispersing operation, ball-mills, colloid-mills, or high-speed disperser can be appropriately used.

Generally, in order to adjust the viscosity of the dispersion-type paint, known solvents for paint having no solvation effect with respect to polyvinylidene fluoride such as, for example, xylene, acetone, methyl-isobutyl-ketone, diisobutyl-ketone, etc. are added to the dispersion liquid. A preferable range of adding quantity of this diluent is in general from 1 to 50% to the total weight of the dispersion.

When a stable paint composition of dispersion type is obtained by mixing together the mixture solvent, the polyvinylidene fluoride particles, and other additional materials, air remaining in the paint is expelled as necessity arises. The dispersion-type paint is applied to an object to be coated by means of spraying, dipping, brushing, roll-coating, etc. and then the coated paint is dried under heat in an oven.

In manufacturing the paint according to the present invention, it may be allowed to add to the mixture of the mixture solvent, the polyvinylidene fluoride particles, and diluent a coloring matter (pigment), a filler, and other assistants for ordinary paint so as to improve coloring of the paint coating, conditions of the paint, and paintability thereof, as is the case with the known dispersion-type paint.

The coated paint is dried at a temperature higher than the crystalline melting point $Tm$ of polyvinylidene fluoride, i.e., 180° C.; 320° C., for 5 to 60 minutes, thereafter it is left to cool at a room temperature, or subjected to rapid cooling with water at a room temperature of 40° C. or below. If the paint coating is left to cool at the room temperature, it assumes smooth and semi-gloss surface, and is given chemical-resistant as well as weather-resistant properties. If the paint coating is rapidly cooled with water of room temperature at less than 40° C., smooth and good gloss surface is obtained. It also exhibits remarkable chemical- and weather-resistant properties.

In order to induce persons skilled in the art to readily put the present invention into practice, the following actual examples are presented.

EXAMPLE 1

The following materials are mixed at the specified ratios and sufficiently dispersed by means of a high-speed disperser, after which foams of air are expelled from the resultant dispersion under a reduced pressure.

|  | G. |
|---|---|
| Polyvinylidene fluoride particles | 30 |
| Dimethylphthalyl-ethylglycolate | 40 |
| Dimethylformamide | 10 |
| Xylene | 20 |
| Total | 100 |

This dispersion is applied by means of a coating rod (No. 50 bar-coater) onto a piece of aluminium plate which has been subjected to a chromate-treatment beforehand. The coated object is then dried for 10 minutes in an oven of 250° C., thereafter it is rapidly cooled in a water bath at a room temperature.

EXAMPLE 2

The following materials are mixed at the given ratios and a dispersion liquid is prepared in the same manner as in Example 1 above.

|  | G. |
|---|---|
| Polyvinylidene fluoride particles | 30 |
| Diisobutylphthalate | 40 |
| Dimethylacetamide | 10 |
| Diisobutylketone | 20 |
| Total | 100 |

This dispersion liquid is applied by means of a coating rod (No. 50 bar-coater) onto a piece of aluminium plate which has previously been subjected to a chromate-treatment. The coated object is then dried for 10 minutes in an oven of 250° C., thereafter it is rapidly cooled in a water bath at a room temperature.

EXAMPLE 3

The following materials are mixed at the given ratios, and a dispersion is prepared in the same manner as in Example 1 above.

|  | G. |
|---|---|
| Polyvinylidene fluoride particles | 40 |
| Dibutylphthalate | 35 |
| Dimethylformamide | 15 |
| Diisobutylketone | 10 |
| Total | 100 |

This dispersion liquid is applied by a coating rod (No. 50 bar-coater) onto a piece of aluminium plate which has been previously subjected to a chromate-treatment. The coated object is then dried for 5 minutes in an oven of 300° C., after which it is left to cool at a room temperature.

EXAMPLE 4

The following materials are mixed at the given ratios, and then the mixture is sufficiently crushed by means of a dispersing apparatus such as pot-mill, etc. to prepare a dispersion liquid enamel, after which foams are expelled from the resultant dispersion enamel.

|  | G. |
|---|---|
| Polyvinylidene fluoride particles | 20 |
| Diisobutylphthalate | 40 |
| Dimethylacetamide | 10 |
| Titanium white | 15 |
| Tin containing stabilizer | 1 |
| Diisobutylketone | 14 |
| Total | 100 |

The dispersion enamel is applied by a coating rod (No. 70 bar-coater) onto a steel plate which has been subjected to sand-blasting. The coated object is heated for 5 minutes in an oven of 300° C., thereafter it is rapidly cooled in a water-bath at a room temperature.

EXAMPLE 5

The following materials are mixed at the given ratios, and a dispersion is prepared in the same manner as in Example 1 above.

|  | G. |
|---|---|
| Polyvinylidene fluoride particles | 30 |
| Methylphthalyl-ethylglycolate | 40 |
| Dimethyl-acetoamide | 5 |
| Dimethylformamide | 5 |
| Xylene | 20 |
| Total | 100 |

The dispersion liquid is applied by a coating rod (No. 50 bar-coater) onto a piece of aluminium plate which has previously been subjected to chromate-treatment. The coated object is dried for 5 minutes in a drying furnace at a temperature of 300° C., subsequently leaving it to cool at a room temperature.

EXAMPLE 6

The following materials are mixed at the specified ratios, and a dispersion is prepared in the same manner as in Example 1 above.

|  | G. |
|---|---|
| Polyvinylidene fluoride particles | 30 |
| Methylphthalyl-ethylglycolate | 20 |
| Methylisobutylphthalate | 20 |
| Dimethylacetoamide | 5 |
| Dimethylformamide | 5 |
| Xylene | 20 |
| Total | 100 |

This dispersion liquid is applied by means of a coating rod (No. 50 bar-coater) onto a piece of aluminium plate which has been subjected to a chromate treatment beforehand. The coated object is dried for 5 minutes in an oven of 300° C., after which it is left to cool at a room temperature.

EXAMPLE 7

The following materials are mixed at the given ratios and a dispersion is prepared in the same manner as in Example 1 above.

|  | G. |
|---|---|
| Polyvinylidene fluoride particles [1] | 30 |
| Methylphthalyl-ethylglycolate | 40 |
| Dimethylacetamide | 10 |
| Diisobutylketone | 20 |
| Total | 100 |

[1] This is a copolymer of vinylidene fluoride and dichloro-difluoroethylene, the content of the latter being approximately 4%.

The dispersion thus prepared is applied by means of a coating rod (No. 50 bar-coater) onto a piece of aluminium plate which has previously been subjected to a chromate treatment. The coated object is then dried for 5 minutes in an oven of 300° C., after which it is left to cool at a room temperature.

EXAMPLE 8 (COMPARATIVE EXAMPLE)

The following materials are mixed together at the given mixing ratio, and a dispersion is prepared in the same manner as in Example 1.

|  | G. |
|---|---|
| Polyvinylidene fluoride particles | 40 |
| Dibutylphthalate | 50 |
| Diisobutylketone | 10 |
| Total | 100 |

The dispersion liquid thus prepared is applied by means of a coating rod (No. 50 rod-coater) onto a piece of aluminium plate which has previously been subjected to a chromate treatment. The coating on the plate is dried for 10 minutes in an oven of 250° C. and then is rapidly cooled in a water bath at a room temperature.

The above-described 8 kinds of the dispersion-type paint were tested under an ordinary testing method of paint using the test pieces on which the paint compositions of the Examples 1–8 are coated. The results are shown in Table 3 below.

TABLE 3

| Test items | Testing conditions | Example Number | | | | | | | |
|---|---|---|---|---|---|---|---|---|---|
|  |  | 1 | 2 | 3 | 4 | 5 | 6 | 7 | 8 |
| Levelling | Bare eyes | E | E | E | E | E | E | E | F |
| Non-existence of craters | do | E | E | E | E | E | E | E | G |
| Non-existence of pinholes | do | E | E | E | E | E | E | E | G |
| Gloss | do | E | E | G | E | G | G | G | G |
| Cross-cut test | 100 equal divisions at 1 mm. intervals | 100/100 | 100/100 | 100/100 | 100/100 | 100/100 | 100/100 | 100/100 | 95/100 |
| Ericksen test | Push-out by 7.5 mm | E | E | E | E | E | E | E | G |
| Impact resistance | ½" 1 kg., 50 cm | E | E | E | E | E | E | E | G |
| Bending | OT (zero T) | E | E | E | E | E | E | E | E |

NOTE.—E=Excellent; G=Good; F=Fair.

As is apparent from the above table, the test pieces of Examples 1 to 7 of the present invention utilizing a mixture solvent remarkably improve various properties of the coating surface in comparison with the test piece of Example 8 utilizing a high boiling point solvent alone.

What we claim is:

1. A dispersion-type paint consisting essentially of a pigment, a vinylidene fluoride-containing polymer, and an organic solvent in which said pigment and polymer are dispersed, wherein said vinylidene fluoride-containing polymer is one selected from the group consisting of a homopolymer of vinylidene fluoride and copolymers of vinylidene fluoride containing therein at least 95 mol percent of vinylidene fluoride, having an intrinsic viscosity in the range of from 0.8 to 5.0, and a particle size of less than 20 microns, said vinylidene fluoride containing polymer being present in an amount of 20–40% by weight, and wherein said organic solvent is a mixture of at least one solvent having a high boiling point, and capable of imparting to said polymer a crystalline melting point Tm in the range of from 110° C. to 150° C. at room temperature, and selected from the group consisting of methyl-phthalyl-ethyl glycolate, diisobutyl-phthalate, dibutylphthalate, diethyl-sebacate, ethyl-phthalyl-ethyl-glycolate, and at least another solvent having a low boiling point, and capable of imparting to said polymer a crystalline melting point Tm in the range of from 40° C. to 70° C. at room temperature, and selected from the group consisting of dimethyl formamide and dimethylacetamide, the ratio of the high boiling organic solvent to the low boiling organic solvent ranging from 90:10 to 70:30 parts by weight.

2. Dispersion type paint as defined in claim 1, in which the boiling point of said high boiling point organic solvent ranges from 300° C. to 400° C. at 760 mm. Hg, and the boiling point of said low boiling point organic solvent ranges from 140° C. to 220° C.

3. A dispersion type paint as defined in claim 1, in which said organic solvent mixture imparts to the polymer a crystalline melting point in the range of from 90° C. to 120° C. at room temperature.

4. The dispersion type paint as in claim 1 wherein the high boiling point solvent is present in amounts from 35 to 40 parts by weight and wherein the low boiling point solvent is present in amounts of 10 to 15 parts by weight.

5. The dispersion-type paint as defined in claim 1, further containing therein from 1 to 50% weight of a diluent having no solvation effect with respect to the vinylidene fluoride-containing polymer and selected from the group consisting of xylene, acetone, methyl-isobutyl-ketone, and diisobutyl-ketone.

References Cited
UNITED STATES PATENTS

| 3,340,222 | 9/1967 | Fang | 260—31.8 F |
| 3,441,531 | 4/1969 | Koblitz et al. | 260—31.8 F |

ALLAN LIEBERMAN, Primary Examiner

U.S. Cl. X.R.

260—31.8 G, 32.2, 32.6 R